(12) United States Patent
Frank

(10) Patent No.: US 9,077,917 B2
(45) Date of Patent: Jul. 7, 2015

(54) IMAGE SENSOR HAVING HDR CAPTURE CAPABILITY

(75) Inventor: Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 13/157,090

(22) Filed: Jun. 9, 2011

(65) Prior Publication Data

US 2012/0314100 A1 Dec. 13, 2012

(51) Int. Cl.
*H04N 5/235* (2006.01)
*H04N 5/353* (2011.01)
*H04N 5/355* (2011.01)

(52) U.S. Cl.
CPC ......... *H04N 5/35554* (2013.01); *H04N 5/2355* (2013.01); *H04N 5/3532* (2013.01); *H04N 5/35536* (2013.01)

(58) Field of Classification Search
CPC .......... H04N 5/35554; H04N 5/35536; H04N 5/2355; H04N 5/3532; H04N 5/3355; H04N 5/355; H04N 5/235; H04N 1/3871; H04N 1/407; H04N 5/23232; H04N 5/35545; H04N 5/35581; H04N 9/67; H04N 9/76; H04N 2209/045; H04N 2209/046; G06T 2207/20212; G06T 2207/20208; G06T 2207/20172; G06T 2207/20216; G06T 2207/20221; G06T 5/50
USPC ........................................... 348/229.1–230.1
See application file for complete search history.

(56) References Cited

U.S. PATENT DOCUMENTS

| | | | |
|---|---|---|---|
| 5,309,243 A * | 5/1994 | Tsai ........................... | 348/221.1 |
| 6,115,065 A | 9/2000 | Yadid-Pecht et al. | |
| 6,707,499 B1 | 3/2004 | Kung et al. | |
| 6,927,796 B2 | 8/2005 | Liu et al. | |
| 7,030,923 B2 | 4/2006 | Ide et al. | |
| 7,067,791 B2 | 6/2006 | Sagatelyan et al. | |
| 7,190,398 B1 | 3/2007 | Yadid-Pecht et al. | |
| 7,382,407 B2 | 6/2008 | Cho et al. | |
| 7,616,243 B2 * | 11/2009 | Kozlowski ..................... | 348/302 |
| 7,940,311 B2 | 5/2011 | Trimeche et al. | |
| 8,483,452 B2 * | 7/2013 | Ueda et al. ..................... | 382/118 |
| 2003/0210345 A1 * | 11/2003 | Nakamura et al. ............ | 348/362 |
| 2006/0170662 A1 | 8/2006 | Kurane | |
| 2007/0273785 A1 * | 11/2007 | Ogawa et al. ................. | 348/362 |
| 2008/0174685 A1 * | 7/2008 | Shan et al. ..................... | 348/308 |

(Continued)

FOREIGN PATENT DOCUMENTS

| | | |
|---|---|---|
| JP | 2011010108 | 1/2011 |
| KR | 1020060022804 | 3/2006 |

OTHER PUBLICATIONS

International Search Report regarding application No. PCT/US12/41398 dated Nov. 5, 2012.

(Continued)

*Primary Examiner* — Pritham Prabhakher
(74) *Attorney, Agent, or Firm* — Wong, Cabello, Lutsch, Rutherford & Brucculeri, LLP

(57) ABSTRACT

A system and method of generating a high dynamic range image. A single reset of an image sensor may be executed followed by two or more reads of the sensor to retrieve data. These reads of the image sensor may be done prior to a subsequent reset of the sensor. These reads may also be accomplished at predetermined times relative to one another. Data read out during these scans may be deinterleaved by an image signal processor and combined into a high dynamic range image.

25 Claims, 6 Drawing Sheets

(56) References Cited

U.S. PATENT DOCUMENTS

| | | | |
|---|---|---|---|
| 2008/0291313 A1* | 11/2008 | Krymski | 348/308 |
| 2009/0091645 A1 | 4/2009 | Trimeche | |
| 2009/0135263 A1* | 5/2009 | Sorek et al. | 348/218.1 |
| 2009/0316031 A1* | 12/2009 | Wakamori | 348/308 |
| 2010/0026838 A1* | 2/2010 | Belenky et al. | 348/229.1 |
| 2010/0026868 A1* | 2/2010 | Pertsel et al. | 348/308 |
| 2010/0165135 A1* | 7/2010 | Kalevo | 348/221.1 |
| 2010/0328490 A1* | 12/2010 | Kurane et al. | 348/229.1 |
| 2011/0013064 A1* | 1/2011 | Lahav et al. | 348/296 |
| 2011/0122287 A1* | 5/2011 | Kunishige et al. | 348/229.1 |
| 2011/0222793 A1* | 9/2011 | Ueda et al. | 382/284 |

OTHER PUBLICATIONS

Extended European Search Report received in corresponding EP Application No. 12171184.0, dated Jun. 20, 2013.

Jinwei Gu, et al., "Coded Rolling Shutter Photography: Flexible Space-Time Sampling," Computational Photography (ICCP) 2010 IEEE International Conference on, IEEE, Piscataway, NJ, USA, Mar. 29, 2010, pp. 1-8, XP031763024, ISBN: 978-1-4244-7022-8.

Office Action received in JP Application No. 2012-132345, dated Aug. 21, 2013.

Office Action received in KR Application No. 10-2012-62155, dated Jul. 22, 2013.

* cited by examiner

IMAGE SENSOR HAVING HDR CAPTURE CAPABILITY

BACKGROUND

The present disclosure relates generally to image capture systems and techniques.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

High dynamic range (HDR) imaging generally relates to a set of imaging techniques that allows for the capture and representation of a greater dynamic range of luminances between the lightest and darkest areas of an image than standard digital imaging techniques. Wider dynamic ranges allows for HDR images to more accurately represent the wide range of intensity levels found in real-world scenes. One method for capturing HDR images includes the merging of multiple independently captured photographs. For instance, this process may include capturing multiple images at different exposures in succession, and then processing them to generate a composite HDR image.

However, there exist disadvantages to the process of generating a HDR image from multiple independently captured images. For example, changes may occur when images are captured successively such that a composite HDR image generated therefrom may not be completely aligned. This may generate motion artifacts in the composite HDR image. Further, the images may be affected by local motion in the image scene, e.g., trees swaying in the wind, people and faces shifting slightly, etc. Additionally, the time required for a HDR image to be processed may be delayed based on the images to be captured. Accordingly, techniques and systems for increasing the speed and continuity with which HDR images may be generated are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present invention relate to the generation of images, particularly in an HDR imaging application. For instance, in one embodiment, a single image may be captured by an image capture device, such as a camera. This captured image may be the result of light energy that is converted into electrical signals (e.g., a voltage) by an image sensor of the image capture device. Multiple scans (i.e., reads) of the image sensor may be made such that one read may correspond to an underexposed representation of the image to be captured while a second read may correspond to an overexposed representation of the image to be captured. This read data may be transmitted along a single path to an image processing circuit, where an image signal processor separates data from the first and second scan. This separated data may be independently stored and recombined by the image signal processor to generate a HDR image, which may be transmitted for display on a display of an electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
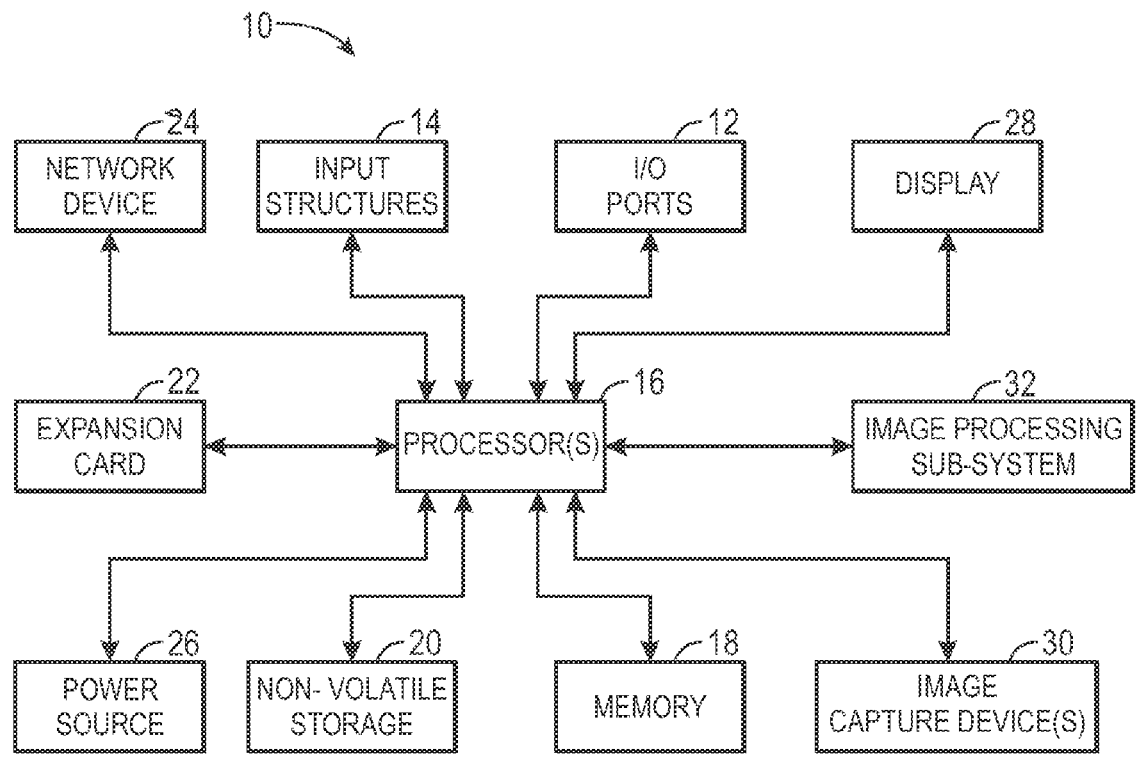
FIG. 1 is a simplified block diagram depicting components of an example of an electronic device that includes an image capture device and an image signal processing subsystem configured to implement an HDR image processing technique in accordance with aspects set forth in the present disclosure.

As will be discussed below, the present disclosure generally provides various techniques for HDR image generation using a digital image sensor and for merging images captures during a single exposure. FIG. 1 is a block diagram illustrating an example of an electronic device 10 that may provide for the generation of digital images in accordance with embodiments of the present disclosure. The electronic device 10 may be any type of electronic device, such as a laptop or desktop computer, a mobile phone, a digital media player, or the like, that may receive and process image data, such as data acquired using one or more image sensing devices. By way of example only, the electronic device 10 may be a portable electronic device, such as a model of an iPod® or iPhone®, available from Apple Inc. of Cupertino, Calif. Additionally, the electronic device 10 may be a desktop, laptop, or tablet computer, such as a model of a MacBook®, MacBook® Pro, MacBook Air®, iMac®, Mac® Mini, Mac Pro®, or iPad® available from Apple Inc. In other embodiments, electronic device 10 may also be a model of an electronic device from another manufacturer that is capable of acquiring and processing image data.

The electronic device 10 may include various internal and/or external components, which contribute to the function of the device 10. Those of ordinary skill in the art will appreciate that the various functional blocks shown in FIG. 1 may comprise hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more imaging devices 30, such as a digital camera, and image processing circuitry (ISP sub-system) 32. As will be discussed further below, the image processing circuitry 32 may implement image processing techniques for processing image data to generate composite HDR images.

The processor(s) 16 may control the general operation of the device 10. For instance, the processor(s) 16 may provide the processing capability to execute an operating system, programs, user and application interfaces, and any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more processing engines (e.g., RISC or CISC processors, graphics processors (GPU), video processors, and/or related chip sets). As will be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, or Preview®, available from Apple Inc., or the "Camera" and/or "Photo" applications provided by Apple Inc. and available on models of the iPhone®. In one embodiment, the processor(s) 16 may also provide for the capability to execute a video conferencing application on the device 10, such as FaceTime®, available from Apple Inc.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. The memory 18 may store a variety of information and may be used for various purposes. For example, the memory 18 may store firmware for the electronic device 10, such as a basic input/output system (BIOS), an operating system, various programs, applications, or any other routines that may be executed on the electronic device 10, including user interface functions, processor functions, and so forth. In addition, the memory 18 may be used for buffering or caching during operation of the electronic device 10. For instance, in one embodiment, the memory 18 may include one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. Thus, although depicted as a single device in FIG. 1 for purposes of clarity, it should be understood that the non-volatile storage device(s) 20 may include a combination of one or more of the above-listed storage devices operating in conjunction with the processor(s) 16. The non-volatile storage 20 may be used to store firmware, data files, image data, software programs and applications, wireless connection information, personal information, user preferences, and any other suitable data. In accordance with aspects of the present disclosure, image data stored in the non-volatile storage 20 and/or the memory device 18 may be processed by the image processing circuitry 32 prior to being output on a display.

The display 28 may be used to display various images generated by device 10, such as a GUI for an operating system, or image data (including still images and video data) processed by the image processing circuitry 32, as will be discussed further below. As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. In one embodiment, the display may be a high-resolution LCD display having 300 or more pixels per inch, such as a Retina Display®, available from Apple Inc. Further, in some embodiments, the display 28 may be provided in conjunction with the above-discussed touch-sensitive mechanism (e.g., a touch screen) that may function as an input structure (14) for the electronic device 10.

As discussed above, the electronic device 10 may include imaging device(s) 30, which may be provided as a digital camera configured to acquire both still images and moving images (e.g., video). The camera 30 may include a lens and one or more image sensors to capture and convert light into electrical signals. By way of example only, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light from an image scene. The image sensor may be coupled to the ISP sub-system 32 via a sensor interface, which may utilize a Standard Mobile Imaging Architecture (SMIA) interface or any other suitable serial or parallel image sensor interface, or a combination of such interfaces.

As those skilled in the art will appreciate, the photodetectors in the imaging pixels of the sensor generally detect the intensity of light captured via the camera lenses. However, photodetectors, by themselves, are generally unable to detect the wavelength of the captured light and, thus, are unable to determine color information. Accordingly, the image sensor may further include a color filter array (CFA) that may overlay or be disposed over the pixel array of the image sensor to capture color information. The color filter array may include an array of small color filters, each of which may overlap a respective pixel of the image sensor and may filter the captured light by wavelength. Thus, when used in conjunction, the color filter array and the image sensor may provide both wavelength and intensity information with regard to light captured through the camera, which may be representative of a captured image.

Figure 2:
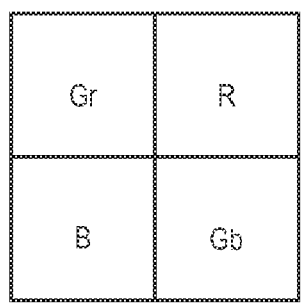
FIG. 2 is a graphical representation of a 2×2 pixel block of a Bayer color filter array that may be implemented in the image capture device of the electronic device of FIG. 1.

In one embodiment, the color filter array may include a Bayer color filter array, which provides a color pattern that is 50% green elements, 25% red elements, and 25% blue elements. FIG. 2 shows a 2×2 pixel block of a Bayer CFA that includes 2 green elements (referred to as Gr and Gb), 1 red element (R), and 1 blue element (B). Thus, an image sensor utilizing a Bayer color filter array may provide information regarding the intensity of the light received by the camera 30 at the green, red, and blue wavelengths, whereby each image pixel records only one of the three colors (red, green or blue). This information, which may be referred to as "raw image data," may then be processed using one or more demosaicing techniques to convert the raw image data into a full color image, generally by interpolating a set of red, green, and blue values for each pixel. Such demosaicing techniques may be performed by the ISP sub-system 32.

Figure 3:
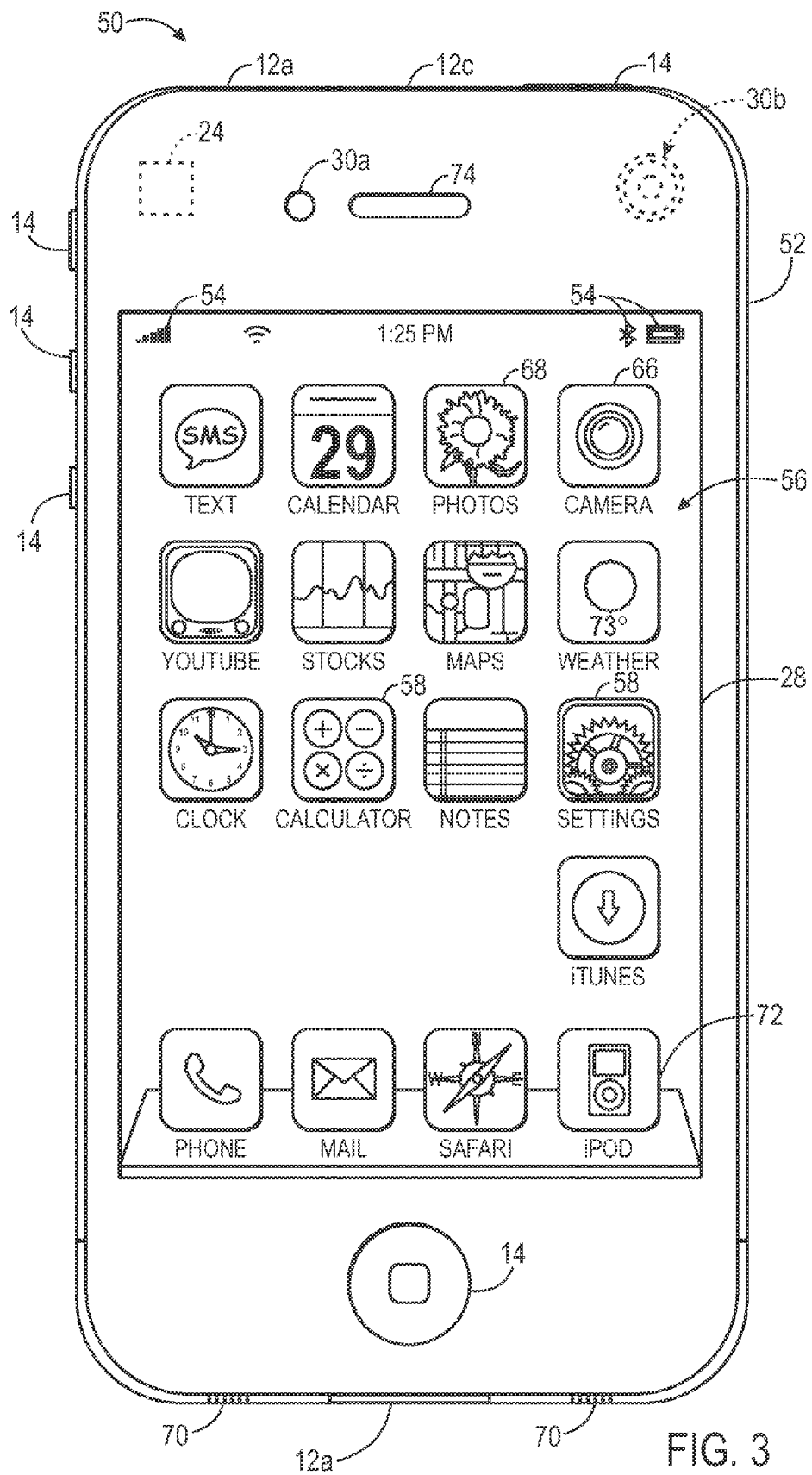
FIG. 3 is a front view of the electronic device of FIG. 1 in the form of a handheld portable electronic device in accordance with aspects of the present disclosure.
Figure 4:
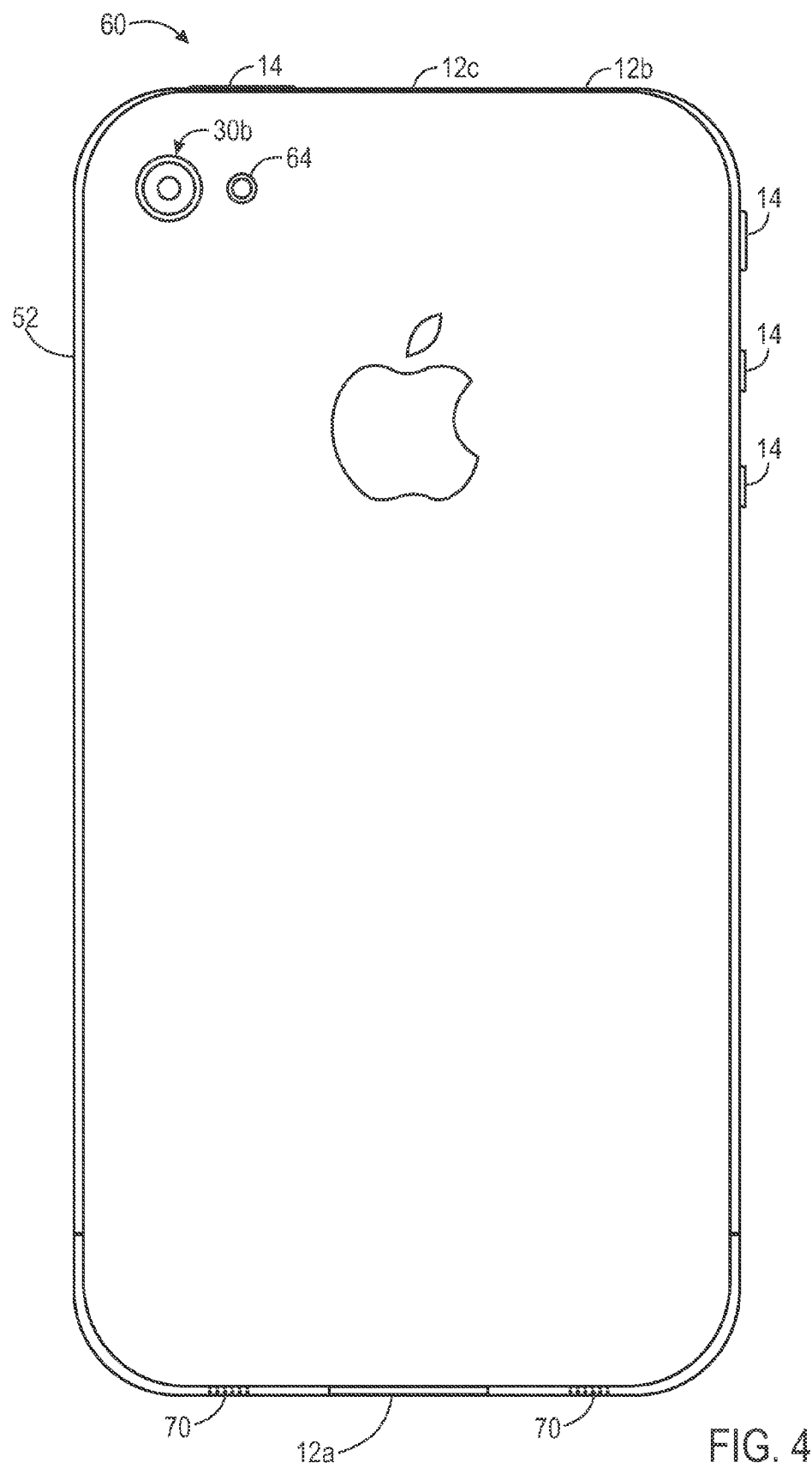
FIG. 4 is a rear view of the handheld electronic device shown in FIG. 3.

Continuing to FIGS. 3 and 4, the electronic device 10 is depicted in the form of a portable handheld electronic device 50, which may be a model of an iPod®, such as an iPod Touch®, or iPhone® available from Apple Inc. The handheld device 50 includes an enclosure 52, which may function to protect the interior components from physical damage and to shield them from electromagnetic interference (EMI). The enclosure 52 may be formed from any suitable material or combination of materials, such as plastic, metal, alloy, or a composite material, and may allow certain frequencies of electromagnetic radiation, such as wireless networking (e.g., 802.11 a/b/g/n networking) and/or telecommunication signals (e.g., GPRS, EDGE, 3G, LTE, etc.), to pass through to wireless communication circuitry (e.g., network device 24), which may be disposed within the enclosure 52, as shown in FIG. 3.

The enclosure 52 also includes various user input structures 14 through which a user may interface with the handheld device 50. For instance, each input structure 14 may control one or more respective device functions when pressed or actuated. By way of example, one or more of the input structures 14 may invoke a "home" screen or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 50 may include any number of suitable user input structures existing in various forms including buttons, switches, keys, knobs, scroll wheels, and so forth.

The handheld device 50 may include various I/O ports 12. For instance, the depicted I/O ports 12 may include a proprietary connection port 12*a* (e.g., a 30-pin dock-connector available from Apple Inc.) for transmitting and receiving data and for charging a power source 26, which may include one or more removable, rechargeable, and/or replaceable batteries. The I/O ports may also include an audio connection port 12*b* for connecting the device 50 to an audio output device (e.g., headphones or speakers). Further, in embodiments where the handheld device 50 provides mobile phone functionality, the I/O port 12*c* may be provided for receiving a subscriber identify module (SIM) card (e.g., an expansion card 22).

The display 28, which may be an LCD, OLED, or any suitable type of display, may display various images generated by the handheld device 50. For example, the display 28 may display various system indicators 54 for providing feedback to a user with regard to one or more states of handheld device 50, such as power status, signal strength, external device connections, and so forth. The display 28 may also display a graphical user interface (GUI) 56 that allows a user to interact with the device 50. In certain embodiments, the presently displayed screen image of the GUI 56 may represent a home-screen of an operating system running on the device 50, which may be a version of the Mac OS® or iOS® (previously iPhone OS®) operating systems, available from Apple Inc.

The GUI 56 may include various graphical elements, such as icons 58 that may correspond to various applications that may be opened or executed upon user selection (e.g., receiving a user input corresponding to the selection of a particular icon 58). In some embodiments, the selection of an icon 58 may lead to a hierarchical navigation process, such that selection of an icon 58 leads to a screen or opens another graphical window that includes one or more additional icons or other GUI elements. In the illustrated embodiment, one of the icons 58 may represent a camera application 66 that may be used in conjunction with one or both of a first front-facing camera 30*a* located on the front side of the device 50 and a second rear-facing camera 30*b* (shown in phantom lines in FIG. 3) on the rear of the device 50 for acquiring images. Referring briefly to FIG. 4, a rear view of the handheld device 50 is illustrated showing the rear-facing camera 30*b* as being integrated with the housing 52 and positioned on the rear of the handheld device 50. In the illustrated embodiment, the rear of the handheld device 50 may include a flash module (also referred to as a strobe) 64, which may be used to illuminate an image scene being captured using the rear-facing camera 30*b*. By way of example, the flash module 64 may include a xenon lighting device and/or a light emitting diode (LED). In one embodiment, the front and rear facing cameras 30*a* and 30*b* may be utilized to provide video-conferencing capabilities, such as through the use of a video-conferencing application based upon FaceTime®, available from Apple Inc.

Additionally, the handheld device 50 may include various audio input and output elements. For example, the audio input/output elements 70, may include an input receiver, such as a microphone. Thus, in embodiments where the handheld device 50 includes mobile phone functionality, the input receivers may receive user audio input, such as a user's voice. Additionally, the audio input/output elements 70 may include one or more output transmitters, which may include one or more speakers that function to transmit audio signals to a user, such as during the playback of music data using a media player application 72. In a mobile phone embodiment, an additional audio output transmitter 74 may be provided, as shown in FIG. 3. Like the output transmitters of the audio input/output elements 70, the output transmitter 74 may also include one or more speakers that transmit audio signals to a user, such as voice data received during a telephone call.

Thus, in a mobile phone embodiment, the audio input/output elements 70 and 74 may collectively function as the audio receiving and transmitting elements of a telephone.

Having now provided some context with regard to some form factors that the electronic device 10 may take, certain HDR imaging techniques that may be implemented on the electronic device 10 in accordance with embodiments set forth in the present disclosure will now be discussed in further detail. For example, the image processing circuitry 32 may perform image merging of captured images to generate a composite HDR image. In one embodiment, for HDR imaging, the camera 30 may acquire multiple images in during a single exposure, including one or more images at a low exposure level (underexposed) and one or more images at a high exposure level (overexposed), which may be utilized to generate a single composite HDR image by the image processing circuitry 32. Alternatively, the camera 30 may acquire at least one image at a low exposure level (underexposed), at least one image at a normal exposure level, and at least one image at a high exposure level (overexposed). The image processing circuitry 32 may process these images to generate a composite HDR image.

Figure 5:
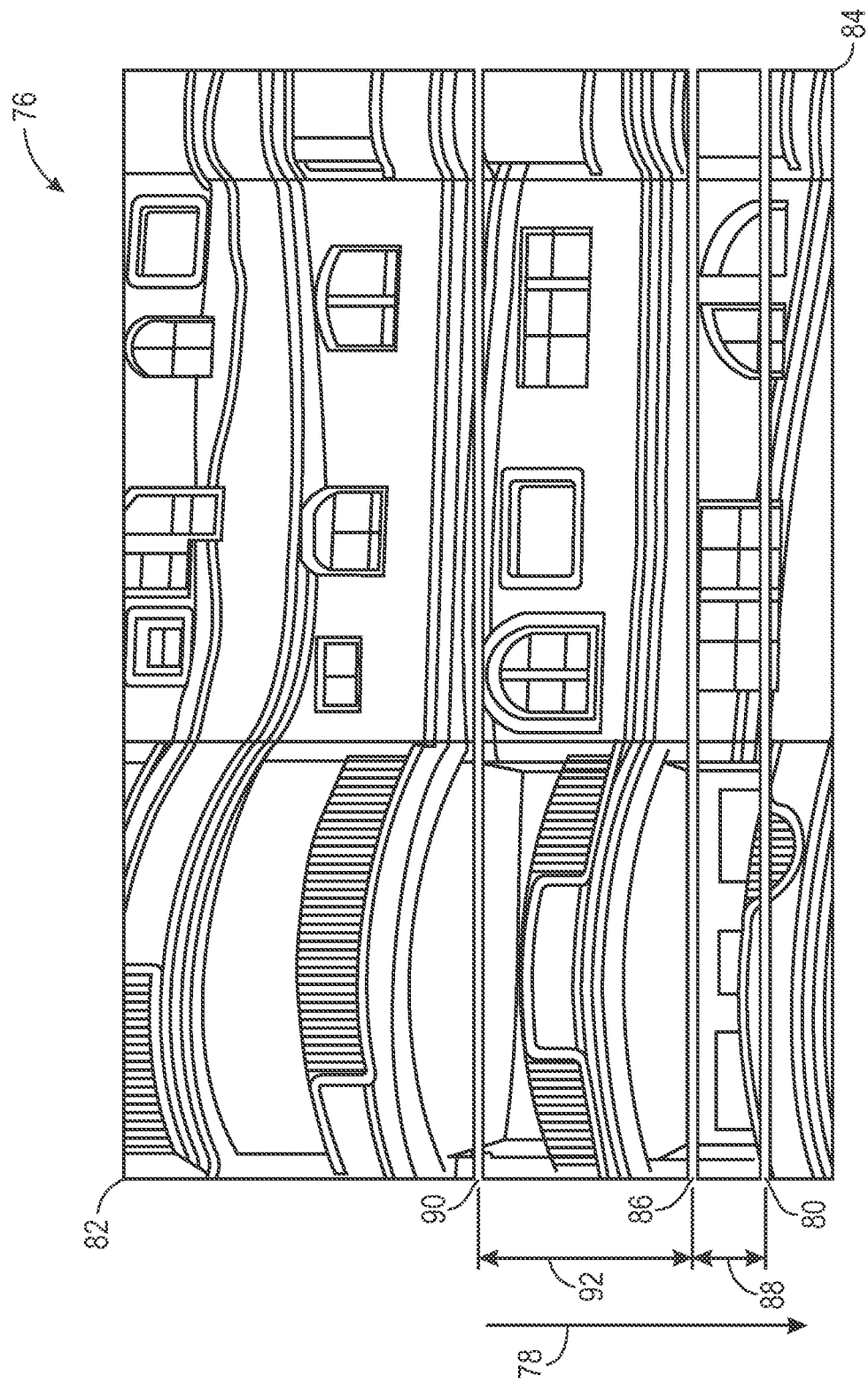
FIG. 5 shows an example of an image to be captured via the electronic device of FIG. 1.

FIG. 5 illustrates an example of an image 76 to be captured by the image sensor of the camera 30. The image 76 may be captured by the camera 30 via a process utilizing a rolling shutter method of image acquisition (i.e., a line scan acquisition and line scan reset for pixels to start the exposure). That is, the camera 30 may record an image not from a single snapshot at a single point in time, but rather by rolling (i.e., moving) the shutter across the exposable area of an image sensor of the camera 30 instead of exposing the image area (frame) all at the same time. Accordingly, a frame of information is captured by pixels in the image sensor of the camera 30 in rows (either vertically or horizontally oriented), such that all parts of the image 76 are not recorded at exactly the same time, though the entirety of the image 76 will may by reconstituted for display as the single image 76 during playback. In other embodiments, a global shutter method of image acquisition may be employed in which an entire frame is exposed for the image sensor at the same time.

As illustrated in FIG. 5, the scan direction for the image 76 may be represented by line 78. That is, the rolling shutter reset 80 may move from the uppermost portion 82 of the image 76 to the lowermost portion 84 of the image 76 to reset pixels in the image sensor. As the pixels of the image sensor are reset by the rolling shutter reset 80, the reset pixels may begin to collect light that corresponds to a portion of the image 76. That is, the pixels of the image sensor in the camera 30 may be exposed to light, which will be collected and utilized to generate the image 76. In one embodiment, the rolling shutter reset 80 may move from portion 82 to portion 84 of the image 76 (i.e., across a full frame) in a fixed amount of time "t" (i.e., the frame time). For example, this fixed amount of time t may be $\frac{1}{15}$ of a second, $\frac{1}{30}$ of a second, $\frac{1}{60}$ of a second, $\frac{1}{125}$ of a second, $\frac{1}{250}$ of a second, $\frac{1}{500}$ of a second, $\frac{1}{1000}$ of a second, $\frac{1}{5000}$ of a second, $\frac{1}{10000}$ of a second, or another amount of time. This fixed amount of time t may also automatically be adjusted by, for example, the processor(s) 16 executing an imaging applications on the electronic device 10, such as Photo Booth®, Aperture®, iPhoto®, or Preview®, available from Apple Inc., or the "Camera" and/or "Photo" applications provided by Apple Inc. and available on models of the iPhone®, or adjusted by a user during interaction with, for example, one of the above mentioned imaging applications.

To generate a HDR image during a single exposure of the frame (i.e., fixed amount of time t during which the rolling shutter reset 80 moves across a frame), multiple reads of the same row of pixels of the image sensor may occur. For example, a first data read 86, of the data stored in a row of pixels, may be undertaken at a time n, where n is a fixed fractional time of time t. This time n may be, for example, $\frac{1}{2}$, $\frac{1}{3}$, $\frac{1}{4}$, $\frac{1}{5}$, $\frac{1}{10}$, $\frac{1}{20}$, or another value of the frame time t. This time n may be represented as line 88 in FIG. 5. That is, the first data read 86 may occur at a time n subsequent to the reset of a row of pixels by the rolling shutter reset 80. Accordingly, as the rolling shutter reset 80 passes downwards along line 78, the first data read 86 may trail the rolling shutter reset 80 by time n. In this manner, data stored in the pixels for each row of the frame may be read at a time n after the rolling shutter reset 80 of that row of pixels. Thus, each row of pixels read as the first data read 86 passes across the image sensor will have been exposed to light for the same time n, which may be referred to as an exposure time or integration time.

It should be noted that this first data read 86 might correspond to generation of a picture at a low exposure level (underexposed). That is, the first data read 86 may be useful in generating a picture in which shadowed areas of the image 76 are poorly rendered but bright areas of the picture are rendered clearly. That is, the data corresponding to the first data read 86 may be useful in rendering the bright portions of a HDR image.

Subsequent to the first data read 86, a second data read 90 may be performed on the data stored in, for example, a row of pixels of the image sensor. This second data read 90 may be at, a time m represented by line 92 in FIG. 5. This time m may be a multiple of time n. For example, time m may be equal to n, 1.5 time n, two times n, 205 times n, three times n, 3.5 times n, four times n, or another multiple of time n. In one embodiment, time m represented along line 92 may be three times n such that the second data read 90 may be performed at an overall time of four times n (i.e., 4n). That is, the second data read 90 may occur at a time 4n subsequent to the reset of a row of pixels by rolling shutter reset 80. Accordingly, as the rolling shutter reset 80 passes downwards along line 78, the second data read 90 may trail the rolling shutter reset 80 by time 4n. In this manner, data stored in the pixels for each row of the frame may be read at a time 4n after the rolling shutter reset 80 of that row of pixels, Thus, each row of pixels read as the second data read 90 passes across the image sensor will have been exposed to light for the same time 4n. In this manner, multiple exposures (e.g., one with exposure time n and one with exposure time 4n) may be accomplished during <a single frame capture.

It should be noted that the second data read 90 might correspond to generation of a picture at a high exposure level (overexposed). That is, the second data read 90 may be useful in generating a picture in which shadowed areas of the image 76 are rendered clearly but bright areas of the picture may be washed out. That is, the data corresponding to the second data read 90 may be useful in rendering the dark portions of a HDR image. In this manner, data from the first data read 86 may be used to generate bright portions of a HDR image and data from the second data read 90 may be used to generate dark portions of a HDR image so that the composite HDR image may have an improved dynamic range and, thus, be more visually appealing than a picture rendered from data of either of the first data read 86 or the second data read 90. Additionally, other data reads may be undertaken in addition to the first data read 86 and the second data read 90. For example, a third data read may be undertaken at a time between the first data read 86 and the second data read 90 such that the third data read corresponds to a "normal" exposure (for example, at time 2n if the first data read 86 was at time n and the second data read was at time 4n). This third data read may be combined with the data from the first data read 86 and the second data read 90 to generate a composite HDR image.

Additionally, the processor(s) 16 executing an imaging application on the electronic device 10 may also alter the readout time n and any subsequent multiple thereof as well as the overall number of data reads. This alteration may be performed based on feedback regarding such factors as brightness of the subject to be photographed, the exposure index of the camera, noise, or other factors. For example, more data reads may occur at slower frame rates and delayed readout times n may occur at lower brightness levels. Through alteration of the readout times of the data reads (e.g., data readouts 86 and 90), the exposure times may be adjusted to allow for modifications to the HDR image to be generated.

Figure 6:
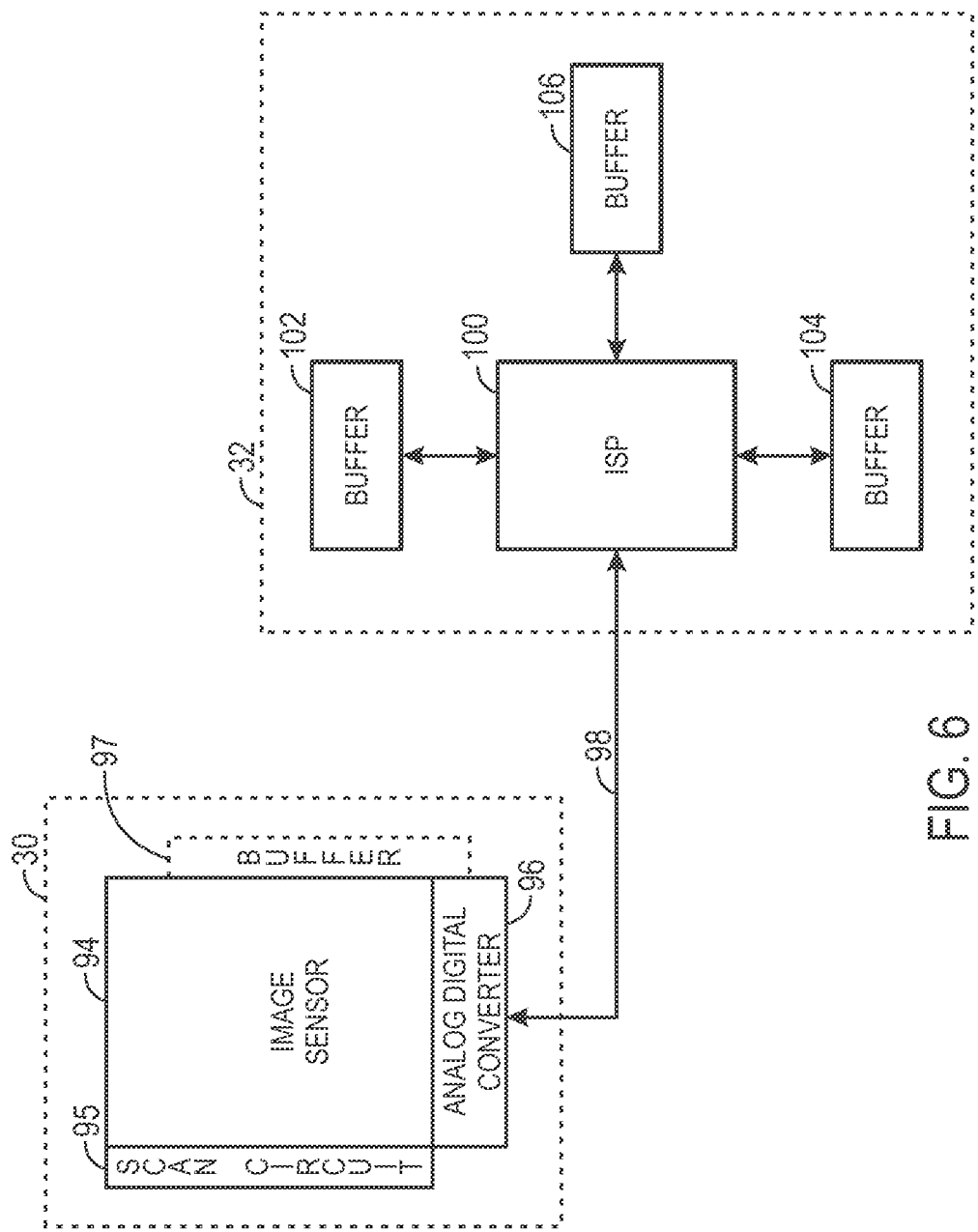
FIG. 6 is a block diagram of the image capture device and the image signal processing subsystem of the electronic device of FIG. 1.

FIG. 6 illustrates a block diagram of elements of the camera 30 and the image processing circuitry 32 that may be utilized to generate a HDR image. The camera 30 includes an image sensor 94 to capture and convert light into electrical signals. The image sensor 94 may be, for example, a CMOS image sensor (e.g., a CMOS active-pixel sensor (APS)) or a CCD (charge-coupled device) sensor. Generally, the image sensor 94 in the camera 30 includes an integrated circuit having an array of pixels, wherein each pixel includes a photodetector for sensing light from an image 76. The pixels may be reset via the rolling shutter reset 80 as described above with respect to FIG. 5 and may operate to read out the captured light values as electrical signals during a first data read 86, a second data read 90, or other data reads. For example, a first data read 86 may occur at time n discussed above to generate data corresponding to an underexposed picture, a second data read 90 may occur at time 4n to generate data corresponding to an overexposed picture, and a third data read may occur at a time 2n to generate data corresponding to an average (i.e., normal) exposed picture.

The rolling shutter reset 80, the first data read 86, the second data read 90, and any other data reads may be performed by the scan circuit 95. The scan circuit 95 may receive one or more activation signals, for example, from processor(s) 16 and may operate to transmit data read signals to various pixels of the image sensor 94. For example, the scan circuit 95 may transmit activation signals to a row of pixels during the first data read 86 (e.g., at time n) to cause data to be transmitted from the activated row of pixels. The scan circuit 95 may subsequently transmit activation signals to that same row of pixels during the second data read 90 (e.g., at time 4n) to cause data to be transmitted from the activated row of pixels. In this manner, the scan circuit 95 may allow for data to be read out of the image sensor 94 multiple times prior to a shutter reset.

The data read out of the image sensor 94 may be transmitted to an analog to digital (A/D) converter 96. The A/D converter 96 may, for example, be on the same chip or circuit as the image sensor 94 or the A/D converter 96 may be electrically coupled to the image sensor. The A/D converter 96 may be, for example, a pipelined A/D converter or a column A/D converter. The A/D converter 96 may receive the data read out from the image sensor 94 during, for example, the first data read 86 and may convert the received data into digital signals (digital data) that correspond to the received data values. This digital data may then be transmitted to the image processing circuitry 32 along path 98. Path 98 may include a Mobile Industry Processor Interface Camera Serial Interface (MIPI CSI), a standard mobile industry architecture (SMIA) interface, or any other suitable parallel or serial interface. Accordingly, in one embodiment, the data may be transmitted to the image processing circuitry 32 in a serial fashion.

However, as noted above, multiple data reads of the image sensor 94 may occur during a single exposure (e.g., a first data read 86, a second data read 90, and/or other data reads). Thus, the data received via each of these reads must share the path 98. To accomplish this, staggered reads of the image sensor 94 may be performed. That is, data from the first data read 86 may be transmitted to the A/D converter until such time as the second read 90 commences. At this time, data may be read from the image sensor 94 first along the row corresponding to the first data read 86 and then along the row corresponding to the second data read 90. This process may be repeated (e.g., in an interleaved manner) as long as the time that two reads are being performed overlaps. Moreover, if a third or more read is introduced, it may likewise be staggered with all other reads such that each read transmits data to the A/D converter 96 in a staggered fashion. In this manner, as the A/D converter 96 converts the data provided to it into digital form as it is received, the digital data transmitted along path 98 may include, for example, data read from the first data read 86, data read from the second data read 90, as well as data read from any additional data readouts.

In one embodiment, a buffer 97 may be implemented as a line buffer (i.e. memory to store data corresponding to a read out row of data) on the same chip or circuit as the image sensor 94. This buffer 97 may store the data received from a data read (e.g. first data read 86) so that the data may be binned (e.g., 4×4 binning) prior to conversion by the A/D converter 96. That is, data from a cluster of pixels may be combined into a single pixel value, thus reducing the impact of read noise imparted to the data read from the image sensor 94. In one embodiment, data related to both overexposed and underexposed pictures may be binned to reduce the amount of data transferred on the interface.

Additionally or alternatively, the buffer 97 may be utilized to align streams of data for multiple data reads. That is, buffer 97 may be a frame buffer that may store the entirety of one data read (e.g., the second data read 90) for transmission while a second data read (e.g., first data read 86) is transmitted without storage. That is, while the data reads may be staggered, the data transmitted along path 98 may include all of the data read out from the first data read 86 and subsequently all the data read out from the second data read 90 (and transmitted from the buffer 97). Use of the buffer 97 in this manner may allow for reduced complexity in separating data from data path 98 (i.e., the data on data path 98 will not be interleaved).

The digital data passed along path 98 may be received at the image processing circuitry 32. As noted above, this digital data may include data from more than one read of the image sensor 94 (i.e., data related to different exposure times). Accordingly, in one embodiment, the digital data corresponding to the first data read 86, the second data read 90, or any other data reads may include an identifier, such as one or more identification bits, so that the data received may be identified as belonging to a particular data read (e.g., the first data read 86). In this manner, the digital data may be tagged so that correct categorization of the received digital data as related to a particular data read, for example, by an image signal processor (ISP) 100, may occur. Moreover, it should be noted that the ISP 100 might be utilized to adjust the readout times (e.g., when data reads are performed). For example, the ISP 100 may be utilized to generate statistical data relating to such factors as exposure, white balance, and focus of the imaging device 30. This data may be utilized to adjust the readout times of the imaging device 30 and, thus, the HDR image.

As noted above, the ISP 100 may receive the digital data and may operate to separate the data received from path 98 into respective exposures. For example, the ISP 100 may separate data read from the first data read 86 and store that separated data in buffer 102, which may be a memory location. Similarly, the ISP 100 may separate data read from the second data read 90 from the received data along path 98 and store the separated data in buffer 104, which may be a memory location. In some embodiments, buffer 102 and 104 may be separate locations of a single physical memory circuit. In other embodiments, buffer 102 and 104 may be located in distinct memory circuits. Additionally, the ISP 100 may operate to separate as many data portions as are read from the image sensor 94, and, for example, may include additional buffers that correspond to each additional data read performed.

Once all the data related to, for example, a first data read 86 and a second data read 90 is separated, each of the buffers 102 and 104 may include a full set of data that may be utilized to form an HDR image. Accordingly, the ISP 100 may combine the data stored in buffer 102 and 104 to generate a composite HDR image, which may be transmitted to buffer 106 for retrieval by the processor(s) 16. In one embodiment, the HDR image may contain a higher bit depth than the data stored in buffer 102 and 104. For example, the HDR image stored in buffer 106 may include one, two, three, or more bits of extra information relative to the data stored in buffer 102 or 104. This higher bit depth of the HDR image may allow for more clarity and/or a more visually appealing picture to be generated.

Figure 7:
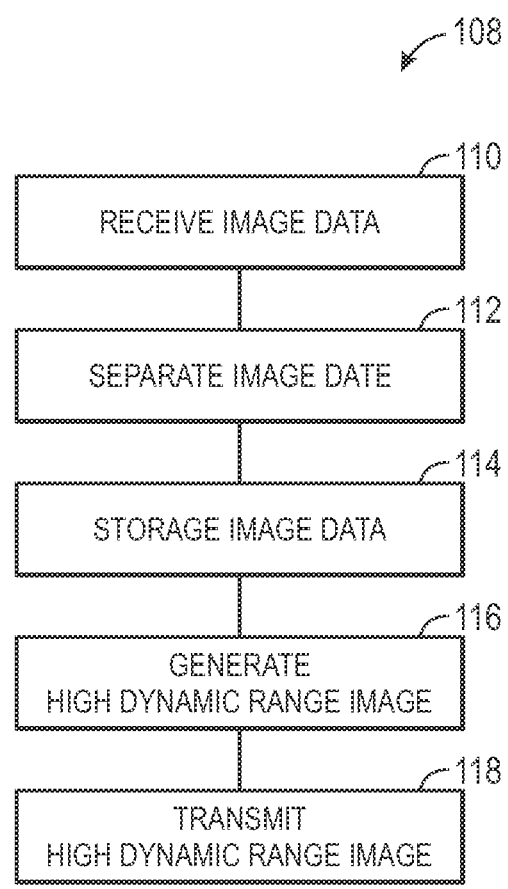
FIG. 7 is a flow chart illustrating the operation of an image signal processor of the image signal processing subsystem of FIG. 6.

FIG. 7 illustrates a flow chart 108 that details one embodiment of the operation of the ISP 100. In step 110, the ISP 100 may receive the digital data from path 98. The ISP 100 may separate the data received from path 98 into respective exposures in step 112. This separation may be accomplished by determining which data read a given set of data corresponds to by analyzing an identifier (i.e., one or more identification bits, for example, appended to the data) associated with the received data so that the received data be classified as belonging to a particular data read (e.g., the first data read 86).

Once the received image data has been separated, the ISP 100 may store the separated data in step 114. For example, data from the first data read 86 may be stored in buffer 102, which may be a memory location. Similarly, data from the second data read 90 may be stored in buffer 104, which may be a memory location separate from buffer 102. Additionally, data from the any additional data reads may be stored in additional buffers by the ISP 100.

Once all the data related to these data reads has been stored, the ISP 100, in step 116, may generate a HDR image. That is, each of the buffers 102 and 104, as well as any additional buffers utilized, may include a full set of data that may be utilized to form an HDR image. The ISP 100 may combine the data stored in the buffers to generate a composite HDR image, which may be transmitted to buffer 106 for transmission to the processor(s) 16 in step 118. In this manner, the ISP 100 may be utilized to generate a HDR image from a single rolling shutter reset 80 of the image capture device 30.

As will be understood, the various techniques described above and relating to the HDR imaging are provided herein by way of example only. Accordingly, it should be understood that the present disclosure should not be construed as being limited to only the examples provided. Further, it should be appreciated that the HDR imaging techniques may be implemented in any suitable manner, including hardware (suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An image processing circuit comprising:
   an image sensor having an array of pixels;
   a data path configured to transmit image data related to multiple exposures of a single image;
   a scan circuit configured to receive a plurality of activation signals from a processor to allow for the image data to be read out of the image sensor multiple times for each row of pixels in the array of pixels prior to a shutter reset, wherein a number of read outs and a frequency of read outs are determined by the processor prior to a first of the plurality of activation signals and based on feedback factors, the feedback factors associated with capture metrics for the single image;
   an image signal processor coupled to the data path, wherein the image signal processor is configured to receive the image data and to separate the image data into at least two categories based on at least one criteria; and
   a first buffer coupled to the image signal processor and configured to store a first portion of the image data, the first portion corresponding to at least one of the at least two categories.

2. The image processing circuit of claim 1, comprising a second buffer coupled to the image signal processor and configured to store a second portion of the image data, the second portion corresponding to a second one of the at least two categories.

3. The image processing circuit of claim 2, wherein the image signal processor is configured to retrieve the first and the second portions of the image data stored in each of the first and the second buffer and to utilize the retrieved first and second portions of the image data to generate a high dynamic range image.

4. The image processing circuit of claim 3, comprising a third buffer coupled to the image signal processor and configured to store the high dynamic range image.

5. The image processing circuit processor of claim 1, wherein the at least one criteria comprises a value corresponding to a time at which the image data was transmitted along the data path.

6. The image processing circuit processor of claim 1, wherein the at least two categories comprise an underexposed image data category and an overexposed image data category.

7. A method of generating a high definition image comprising:
   determining feedback factors associated with image capture metrics for a single image;
   determining a number of times and frequency of a plurality of read requests to send to each row of pixels in an image sensor prior to a shutter reset for the single image, the number of times and the frequency being based on the feedback factors, wherein the determining a number of times and frequency is performed by a first processor prior to a first of the plurality of read requests;
   receiving at an image signal processor image data related to the plurality of read requests;
   separating at the image signal processor the image data into at least two categories based on at least one criteria; and
   storing, in a first buffer, a first portion of the separated image data, the first portion corresponding to at least one of the at least two categories.

8. The method of claim 7, further comprising storing in a second buffer a second portion of the separated image data, the second portion corresponding to a second one of the at least two categories.

9. The method of claim 8, comprising retrieving the first and the second portion of the separated image data stored in each of the first and the second buffers and generating a high dynamic range image based on the retrieved data.

10. The method of claim 8, comprising storing in a third buffer a third portion of the separated image data, the third portion corresponding to a third one of the at least two categories and retrieving the first, the second and the third portions of the separated image data stored in each of the first, the second, and the third buffer and generating a high dynamic range image based on the retrieved data.

11. The method of claim 7, wherein separating the image data into at least two categories based on at least one criteria comprises separating the image data into at least two categories based on a time at which the image data was transmitted to the image signal processor.

12. The method of claim 7, wherein separating the image data into at least two categories comprises separating the image data into an underexposed image data category and an overexposed image data category.

13. An image capture device comprising:
a lens configured to receive light corresponding to capture of a single image;
an image sensor coupled to the lens, wherein the image sensor includes an array of pixel locations and is configured to receive the light corresponding to the single image from the lens and generate data values corresponding to the received light at the pixel locations in the image sensor
a processor configured to determine a number of times and a frequency of a plurality of read requests of each row of pixel locations in the array prior to a shutter reset to send to an image sensor for the single image based on feedback factors, wherein the determined number of times and frequency are determined prior to a first of the plurality of read requests and based on the feedback factors; and
a scan circuit coupled to the image sensor, wherein the scan circuit is configured to read out a plurality of sets of data values corresponding to the received light from a row of pixel locations in the image sensor for each of the plurality of read requests,
wherein each of the plurality of read requests occurs prior to a single shutter reset of the pixel locations.

14. The image capture device of claim 13, further comprising an analog to digital converter coupled to the image sensor, wherein the analog to digital converter receives the plurality of sets of data values and converts the plurality of sets of data values from analog signals to digital signals.

15. The image capture device of claim 13, further comprising a line buffer configured to receive and store a first set of the plurality of sets of data values prior to transmission to an analog to digital converter.

16. The image capture device of claim 13, further comprising a line buffer configured to receive and store all data signals read out from all pixel locations of the image sensor during a first read by the scan circuit.

17. An electronic device comprising:
an image sensor configured to receive light corresponding to a single image and generate data values corresponding to the received light at pixel locations for an array of pixels in the image sensor;
a processor configured to determine a number of times and frequency of a plurality of read requests of each row of pixel locations prior to a shutter reset to send to the image sensor for the single image, wherein the number of times and frequency are determined prior to a first of the plurality of read requests and based on the feedback factors and the feedback factors are based on the received light;
a scan circuit coupled to the image sensor, wherein the scan circuit is configured to read out a plurality of sets of data values corresponding to the received light from each of the rows of pixel locations in the image sensor for each of the plurality of read requests, wherein each of the plurality of read requests occurs prior to a common reset of the pixel locations;
an analog to digital converter coupled to the image sensor, wherein the analog to digital converter receives the plurality of sets of data values and converts the plurality of sets of data values into image data;
an image signal processor configured to receive the image data and to separate the image data into at least two categories based on at least one criteria; and
a first buffer coupled to the image signal processor, wherein the first buffer is configured to store separated data corresponding to at least one of the at least two categories.

18. The electronic device of claim 17, further comprising a data path coupling the analog to digital converter and the image sensor and the image signal processor, wherein the data path comprises a serial data line.

19. The electronic device of claim 17, further comprising a second buffer coupled to the image sensor and configured to store data signals read out from pixel locations of the image sensor during a first read by the scan circuit.

20. The image processing circuit of claim 17, further comprising a second buffer coupled to the image signal processor and configured to store separated data corresponding to a second one of the at least two categories.

21. The image processing circuit of claim 20, wherein the wherein the image signal processor is configured to retrieve the data stored in each of the first and second buffer and to utilize the retrieved data to generate a high dynamic range Image.

22. A non-transitory computer-readable storage medium storing instructions which, when executed by a computing device, cause the computing device to:
read, in response to a plurality of activation signals, image data from each row of pixels from an image sensor's array of pixels multiple times prior to a shutter reset, wherein a number of times each row of pixels from the image sensor's pixel array is read and a frequency at which each row of pixels from the image sensor's pixel array is read are determined prior to a first of the plurality of activation signals being read and are both based on feedback factors that are associated with capture metrics for a single image;
separate the image data into at least two categories based on at least one criteria; and
store a first portion of the image data in a first buffer, wherein the first portion corresponds to at least one of the two categories.

23. The non-transitory computer-readable medium of claim 22 which, when executed by a computing device, cause the computing device to store a second portion of the image data in a second buffer, wherein the second portion corresponds to a second one of the at least two categories.

24. The non-transitory computer-readable medium of claim 23 which, when executed by a computing device, cause the computing device to retrieve the first and the second portions of the image data and to utilize the retrieved first and second portions of the image data to generate a high dynamic range image.

25. The non-transitory computer-readable medium of claim 22, wherein the at least two categories comprise an underexposed image data category and an overexposed image data category.

* * * * *

UNITED STATES PATENT AND TRADEMARK OFFICE
CERTIFICATE OF CORRECTION

PATENT NO. : 9,077,917 B2  
APPLICATION NO. : 13/157090  
DATED : July 7, 2015  
INVENTOR(S) : Michael Frank Page 1 of 1

It is certified that error appears in the above-identified patent and that said Letters Patent is hereby corrected as shown below:

In the Claims

Column 12, Claim 5, Line 45, delete the word "processor";

Column 12, Claim 6, Line 49, delete the word "processor";

Column 14, Claim 21, Line 46, delete the phrase "wherein the";

Column 15, Claim 23, Line 1, insert the phrase --storing instructions-- after "The non-transitory computer-readable medium of Claim 22";

Column 15, Claim 24, Line 6, insert the phrase --storing instructions-- after "The non-transitory computer-readable medium of Claim 23".

Signed and Sealed this  
Fifteenth Day of December, 2015

Michelle K. Lee  
*Director of the United States Patent and Trademark Office*